United States Patent Office 3,226,393
Patented Dec. 28, 1965

3,226,393
N-SUBSTITUTED DERIVATIVES OF MITOMYCIN A AND MITOMYCIN C
Walter Edward Meyer and James Burns Patrick, Suffern, and John Halley Mowat, Pearl River, N.Y., assignors to American Cyanamid Company, Stamford, Conn., a corporation of Maine
No Drawing. Filed June 7, 1962, Ser. No. 200,631
12 Claims. (Cl. 260—295)

This application is a continuation-in-part of our co-pending application Serial No. 151,156, filed November 9, 1961, and now abandoned.

This invention relates to N-substituted derivatives of mitomycin A and mitomycin C which may be represented by the following general formula:

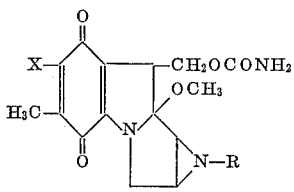

wherein X is a member of the group consisting of lower alkoxy and amino; and R is a member of the group consisting of lower alkyl, lower alkanoyl, mononuclear aralkyl, mononuclear aroyl, mononuclear arylcarbamoyl, lower alkylsulfonyl, mononuclear arylsulfonyl, and carbolower alkoxy, with the proviso that when X is amino, R may not be methyl.

The compounds of this invention are, in general, highly colored crystalline solids, relatively insoluble in water and relatively soluble in organic solvents such as lower alkanols, ethyl acetate, toluene, benzene, chloroform and the like.

The new compounds of this invention may be prepared from mitomycin A and/or mitomycin C, a group of novel antibiotics described by Hata et al. in J. Antibiotics Ser. A, IX, No. 4, 141 (July 1956) and by Wakaki et al. in Antibiotics and Chemotherapy, 8, 228 (1958). The structures of mitomycin A and mitomycin C are reproduced below:

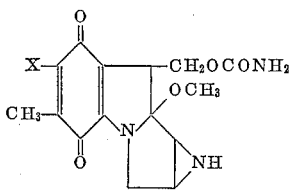

| Compound: | X |
|---|---|
| Mitomycin A | CH₃O— |
| Mitomycin C | H₂N— |

Thus the compounds of this invention can be conveniently prepared by acylation or alkylation of the appropriate mitomycin having hydrogen at the 1a-position. The usual acylating or alkylating agents may be used such as acyl halides, acid anhydrides, lower alkyl halides, and the like. Preferably an inert organic solvent such as dimethylformamide, water, dioxane, dimethylsulfoxide is used in the presence of mild alkali, e.g. sodium bicarbonate or silver oxide. The reaction may be carried out at temperatures ranging from about 0 to 50 C. and preferably at about room temperature, e.g., about 25° C., and for a period of time from about 1 to about 8 hours. For example, mitomycin A may be acylated with benzoyl chloride in the presence of an acid acceptor such as a tertiary amine. To minimize degradation, it is desirable to conduct these reactions under mild conditions. A typical reaction is illustrated schematically below:

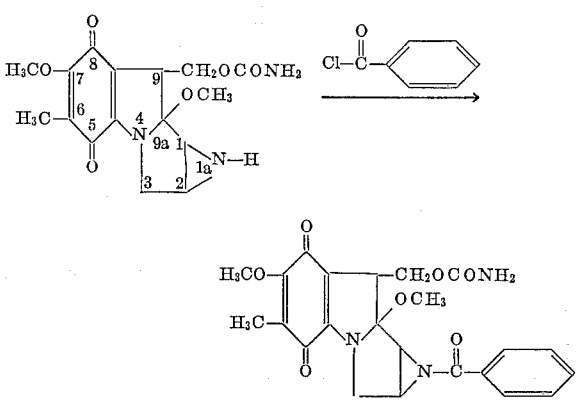

Alternatively, in order to prepare the product designated N-methyl mitomycin A, the product known as porfiromycin and described by C. De Boer et al. in P. Gray, B. Taberkin and S. G. Bradley, Antimicrobial Agents Annular, 1960, may be used as the starting material in lieu of mitomycin A. The structure of porfiromycin is as follows:

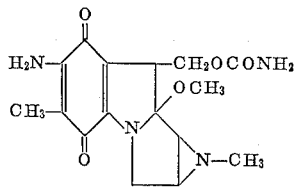

In carrying out this aspect of the present invention, the primary amino group of porfiromycin is converted into a hydroxy group by hydrolysis after which the hydroxy group is alkylated with diazomethane, yielding N-methyl mitomycin A. The conditions of the hydrolysis and subsequent alkylation are not critical and are known to the art.

The new compounds are useful as antibacterial agents and have broad-spectrum antibacterial activity. The antibacterial spectrum of typical compounds of this invention representing the amount required to inhibit the growth of various typical bacteria, was determined in a standard manner by the agar-dilution streak-plate technique which is commonly used in testing new antibiotics. The minimal inhibitory concentrations, expressed in gammas per milliliter of the new products, against various test organisms are reported in the table below. For comparison purposes, the antibacterial spectrum of mitomycin A is also included.

ANTIFUNGAL AND ANTIBACTERIAL ACTIVITY; MINIMAL INHIBITORY CONCENTRATIONS IN MCG. PER ML.

| Product of Example | Myco. 607 | Staph. 209P | Sarc. 1001 | Subt. 6633 | Faec. 8043 | Strep. C203 | Strep. 41 | γ Strep. 11 | Staph. 69 | β Strep. 80 |
|---|---|---|---|---|---|---|---|---|---|---|
| Mitomycin A | 3.1 | 0.2 | 0.05 | 0.2 | { 0.4P / 3.1 } | 0.025 | 0.05 | 0.8 | 0.2 | 1.5 |
| N-acetyl mitomycin A | 3.1 | 6.2 | 1.5 | 1.5 | 12.5 | 0.4 | 0.4 | 6.2 | 3.1 | 6.2 |
| N-(p-bromo-benzenesulfonyl) mitomycin A | | >25 | 25 | 25 | >25 | 6.2 | 12.5 | 25 | 25 | >25 |
| N-(carbethoxy) mitomycin A | { 50 / 100 } | { 12.5 / 12.5 } | | ≤6.2 | { 25 / 12.5P / 50 } | | | | | |
| N-methyl mitomycin A | 5 | 0.62 | .31 | .31 | 1.25 | .08 | .15 | { .62 / 2.5 } | 1.25 | { 1.25 / 5 } |
| N-(p-bromo-phenacyl) mitomycin A | 20 | 5 | 1.25 | 1.25 | 20 | .62 | 1.25 | 5 | 5 | 5 |
| N-(benzyl) mitomycin A | 20 | 2.5 | 1.25 | .31 | 10 | .31 | .62 | 2.5 | 2.5 | 5 |

| Product of Example | Cereus 5 | Kleb. 8 | Alcal. 11 | Coryn. 46 | Sal. gall. | E. Coli 22 | Kleb. 53 | Past. Mult. 51 | Prot. 9484 |
|---|---|---|---|---|---|---|---|---|---|
| Mitomycin A | 0.8 | 0.8 | 1.5 | 0.025 | { >25 / 25 } | 1.5 | 1.5 | 0.2 | 0.4 |
| N-acetyl mitomycin A | 3.1 | 3.1 | 25 | .4 | >25 | 12.5 | 12.5 | 3.1 | |
| N-(p-bromo-benzenesulfonyl) mitomycin A | 25 | >25 | >25 | 12.5 | >25 | >25 | >25 | >25 | |
| N-(carbethoxy) mitomycin A | | | | | | | | | { 25 / 100 } |
| N-methyl mitomycin A | 1.25 | 2.5 | 10 | .31 | | 10 | 5 | | |
| N-(p-bromo-phenacyl) mitomycin A | 2.5 | 20 | | .62 | | | | | |
| N-(benzyl) mitomycin A | 1.25 | 20 | 20 | .62 | | | 20 | | |

Myco. 607=*Mycobacterium smegmatis* ATCC 607.
Staph. 209P=*Staphylococcus aureus* ATCC 6548P.
Sarc. 1001=*Sarcina lutea* PCI 1001; ATCC 9341.
Subt. 6633=*Bacillus subtilis* ATCC 6633.
Faec. 8043=*Streptococcus faecalis* ATCC 8043.
Strep. C203=*Streptococcus pyogenes* C203 β. Hemolytic streptococcus, Group A.
Strep. 41=*Streptococcus pyogenes* NY 5.
γ Strep. 11=β Streptococcus 11. Nonhemolytic streptococcus.
Staph. 69=*Staphylococcus aureus* 69.
β Strep. 80=*Streptococcus hemolyticus* Group D.
Cereus 5=*Bacillus cereus* ATCC 10702.
Kleb. 8=*Klebsiella pneumoniae* (Friedlanders).
Alcal. 11=Alcaligenes sp. ATCC 10153 (formerly PCI 3).
Coryn. 46=*Corynebacterium xerosia* NRRL B-1397.
Sal. gall.=*Salmonella gallinerium*—Led. An. Ind. 604.
E. coli 22=*Escherichia coli*.
Kleb. 53=*Klebsiella pneumoniae* "A" strain AD.
Past. Mult. 51=*Pasteurella multocida* Type 1, strain 310.
Prot. 9484=*Proteus vulgaria* ATCC 9484.

On the basis of in vivo tests in mice N-methyl mitomycin A is less toxic than mitomycin A.

The invention will be described in greater detail in conjunction with the following specific examples.

*Example 1.—Preparation of N-methyl mitomycin A*

A solution of 41.5 mg. of sodium bicarbonate in 1.25 ml. of water was treated with 1.25 ml. of dimethylformamide and 10 mg. of mitomycin A, then 0.5 ml. of acid-free methyl iodide was added. The mixture was stirred in a closed container for about five hours and then allowed to stand overnight at room temperature. The above reaction mixture was aerated with nitrogen to remove excess methyl iodide and then evaporated to dryness in vacuo. The residue was extracted with chloroform and the extract, after evaporation to dryness, was extracted with ether. Evaporation of the ether solution gave N-methyl mitomycin A. Further purification was effected by liquid-liquid partition chromatography. The purified product (6.8 mg.) was crystallized from carbon tetrachloride and heptane. U.V. $\gamma_{max}$ in methanol 320, 525 mµ.

This material was identical by infrared with material prepared from porfiromycin by the method described in Example 3.

*Example 2.—Preparation of N-ethyl mitomycin A*

The process of Example 1 was repeated using ethyl iodide in place of methyl iodide. N-ethyl mitomycin A was obtained.

*Example 3.—Preparation of N-methyl mitomycin A*

A 28.8 mg. sample of porfiromycin was aged in 5 ml. of 0.1 N NaOH for 45 minutes by which time 1 mole of ammonia had been liberated. The reaction was neutralized to pH 7.0 and then evaporated to dryness in vacuo. The salt cake was extracted four times with 5 ml. of freshly distilled tetrahydrofuran, filtered, and cooled to 5° C. in an ice bath. An excess of diazomethane in ether was added and the reaction allowed to stand at room temperature for ½ hour at which time the crude product was isolated by evaporation to dryness in vacuo. Pure N-methyl mitomycin A was obtained after liquid-liquid partition chromatography using a heptane, ethyl acetate, methanol, water (70:30:17:4) solvent system. U.V. in methanol $\gamma_{max}$ 320, 525 mµ.

*Example 4.—Preparation of N-(p-bromophenacyl) Mitomycin A*

A mixture of sodium bicarbonate (0.025 g.), water (2 ml.), dimethylformamide (1.5 ml.), and mitomycin A (0.010 g.), was treated with a solution of p-bromophenacyl bromide (0.016 g.) in dimethylformamide (0.5 ml.). The mixture was warmed to about 40-45° C. and then stirred at room temperature for 3.5 hours. After evaporating to dryness in vacuo, the crude product was taken up on chloroform and, after clarification, the chloroform solution was evaporated to dryness. A clarified ether extract of the residue was evaporated to a small volume and the crude product was precipitated with petroleum ether. Yield, 0.0088 g. of N-(p-bromophenacyl) mitomycin A. This material was further purified by partition chromatography, using the system heptane, ethyl acetate, methanol and water in the proportions 60:40:17:4. The purified product was isolated from the column effluent. Yield, 0.0028 g.

*Example 5.—Preparation of N-(benzyl) mitomycin A*

A mixture of sodium bicarbonate (0.048 g.), water (1.25 ml.), dimethylformamide (1.25 ml.), and mitomycin A (0.010 g.) was treated with benzyl iodide (0.055 ml.) and stirred for six hours at room temperature, and then allowed to stand overnight. The reaction mixture was then evaporated to dryness in vacuo and worked up in a manner substantially similar to that described in Example 4. The crude product was purified by partition chromatography and the purified product was isolated from the column effluent. Yield, 0.0068 g. of N-(benzyl) mitomycin A.

*Example 6.—Preparation of N-methyl mitomycin A*

A solution of mitomycin A (0.02 g.) in dimethylformamide (0.75 ml.) was treated with silver oxide (0.05 g.) and methyl iodide (0.1 ml.) and stirred for one hour at room temperature. After dilution with about four volumes of chloroform, the mixture was filtered and the filtrate was evaporated to dryness. Chromatography of this crude product gave 0.0118 g. of pure N-methyl mitomycin A.

*Example 7.—Preparation of N-acetyl mitomycin A*

Carbonyldiimidazole (167 mg.) in 2.5 ml. of chloroform was treated with 0.05 ml. of glacial acetic acid. After 45 minutes at 25°, the solution was treated with a solution of 20 mg. of mitomycin A, in 1 ml. of chloroform. After 18 hours at 25°, the mixture was extracted with water and the chloroform solution was evaporated to dryness. The residue was taken up in 2.5 ml. of ether clarified and the product was precipitated with petroleum ether. Yield, 19 mg.

*Examples 8, 9 and 10*

Following the procedure of the preceding example and substituting equivalent amounts of other appropriate acylating agents, other N-acyl derivatives of mitomycin A such as p-iodobenzoyl-, iso-nicotinoyl- and 4-iodo-3-nitrobenzoyl- can be readily prepared.

*Example 11.—Preparation of
N-(p-iodophenylcarbamoyl) mitomycin A* p-Iodobenzazide (200 mg.) was refluxed in 9 ml. of dry toluene for ninety minutes to form p-iodophenylisocyanate. After cooling, the solution was diluted with 8 ml. of dry, alcohol-free chloroform and added to a solution of mitomycin A (50 mg.) in 4 ml. of dry, alcohol-free chloroform. After twenty-four hours at room temperature, the mixture was treated with 0.25 ml. of dry ethanol to convert excess reagent to the urethane. After standing for some hours, the solution was clarified and evaporated to dryness at 40° with a stream of nitrogen. The residue was taken up in 10 ml. of ether, clarified, and the product was precipitated by careful addition of 30–60° petroleum ether, washed well with petroleum ether and then reprecipitated from ether as above, to complete the removal of ethyl p-iodophenylcarbamate. The product was dried in vacuo over $P_2O_5$. Yield: 78 mg. Recrystallization was effected from hot benzene, and the material was dried in vacuo at 78° for three hours over $P_2O_5$.

*Analysis.*—Calculated for $C_{23}H_{23}N_4O_7I$ (594.35): C, 46.48; H, 3.90; N, 9.43; I, 21.35. Found: C, 46.90; H, 4.45; N, 9.60; I, 20.28.

*Example 12.—Preparation of
N-(p-iodophenylcarbamoyl) mitomycin C*

The isocyanate solution prepared as above from 200 mg. of azide in 10 ml. of dry toluene was added to a suspension of mitomycin C (50 mg.) in dry chloroform (5 ml.) and pyridine (0.12 ml.). The mixture was stirred for six hours and then allowed to stand overnight at room temperature. Dry ethanol (0.25 ml.) was added to convert excess reagent to the urethane as described above.

The insoluble gray precipitate was collected and saved. The filtrate was treated with about three volumes of petroleum ether and the precipitate was collected. The combined precipitate was washed with petroleum ether, dried, and taken up in ethylacetate. After clarification the red ethyl acetate solution was concentrated to a volume of 1.5 ml. and carefully treated with petroleum ether, giving a gray, crystalline precipitate. This product was recrystallized from ethyl acetate and petroleum ether, and dried. Yield 77.5 mg.

*Example 13.—Preparation of
N-(p-bromobenzenesulfonyl) mitomycin A*

A solution of mitomycin A (100 mg.) in 8 ml. of dry chloroform was treated with 0.45 ml. of di-isopropylethylamine and then with a solution of p-bromobenzenesulfonyl chloride (200 mg.) in 4 ml. of dry chloroform. The mixture was stirred for three hours and allowed to stand at room temperature for about twenty-four hours. The mixture was extracted several times with water and the chloroform solution was dried, clarified, and evaporated to a volume of about 1 ml. The crude product was precipitated with petroleum ether, dried, and further purified by partition chromatography using solvent system heptane:ethylacetate:methanol:water 60:40:17:4. The fraction peaking at about 1.5 hold-back volumes was collected. After evaporation to dryness, the residue was moistened with methylene chloride and slurried with benzene. The crystalline product was collected. Yield 123 mg.

All of the available brosyl derivative (about 205 mg.) was dissolved in 3.5 ml. of methylene chloride, diluted with 2.5 ml. of ether, and clarified. The filtrate was concentrated to a volume of 3.5 ml. and diluted with 6 ml. of carbon tetrachloride. The brosyl derivative crystallized rapidly as a thick mass of cottony crystals. The crystals were collected, washed with carbon tetrachloride and petroleum ether and dried. Yield 190 mg. This material was again dissolved in 3.5 ml. of methylene chloride, diluted with 6 ml. of benzene, and clarified. An additional 6 ml. of benezene was added and the container was capped with aluminum foil. A pinhole was made in the foil cap and the mixture was allowed to stand for 2 days at room temperature. By this slow differential evaporation technique, the brosyl derivative of mitomycin A was obtained as relatively large, predominately single crystals. These were collected, washed with benzene and petroleum ether and dried. Yield: 169 mg. 30 milligrams of this material was dried at 78° in vacuo over phosphorous pentoxide (no loss in weight).

*Analysis.*—Calculated for $C_{22}H_{22}N_3O_8SBr \cdot \frac{1}{2}C_6H_6$: C, 49.42; H, 4.15; N, 6.92; S, 5.28; Br, 13.16. Found: 49.79; H, 4.20; N, 6.69; S, 5.48; Br, 13.21.

*Example 14.—Preparation of
N-(carbethoxy) mitomycin A*

A solution of mitomycin A (0.0710 g.) in 1.0 ml. of dry chloroform containing triethylamine (0.1020 g.) was treated with a solution of ethyl chlorocarbonate (0.0990 g.) in 1.0 ml. of dry chloroform. The mixture was allowed to stand at room temperature for about twenty hours and was then extracted twice with 1.0 ml. portion of water. The aqueous extracts were backwashed with chloroform and the combined chloroform solution was evaporated to dryness in vacuo. The residue was chromatographed and the chromatographically pure product was isolated from the column effluent. Yield, 0.0670 g. The product was soluble in alcohols, chloroform, carbon tetrachloride, benzene, etc., and was most conveniently crystallized from ethanol by the careful addition of petroleum ether, giving purple crystals. The ultraviolet spectrum was similar to that of mitomycin A. The compound melted at about 158–162°, with loss of birefringence at about 145°, and is converted by exposure to dilute acids to a compound having an ultraviolet spectrum similar to that of apo mitomycin A.

*Example 15.—Preparation of N-(benzyl) mitomycin C
from N-benzylmitomycin A*

N-(benzyl) mitomycin A (0.025 g.) was dissolved in about 0.25 ml. of methanol and cooled to 0°. To this was added 5 ml. of methanol saturated with ammonia at 0°. The mixture was stored at 0° for about twenty hours and then evaporated to dryness with a stream of nitrogen. The residue was taken up in 0.5 ml. of chloroform, diluted with 0.5 ml. of ether and the product N-(benzyl) mitomycin C was precipitated by careful addition of heptane. The product was collected, washed with petroleum ether and dried. Weight 0.024 g. U.V. $\lambda_{max}$ 358 μ in methanol.

We claim:
1. A compound of the formula:

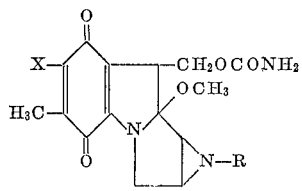

wherein X is selected from the group consisting of lower alkoxy and amino; and R is selected from the group consisting of lower alkanoyl, phenyl lower alkyl, phenacyl, halo-phenacyl, benzoyl, halo-benzoyl, pyridylcarbonyl, phenylcarbamoyl, halo -phenylcarbamoyl, benzene - sulfonyl, halo-benzenesulfonyl and lower carboalkoxy.

2. The compound of the formula:

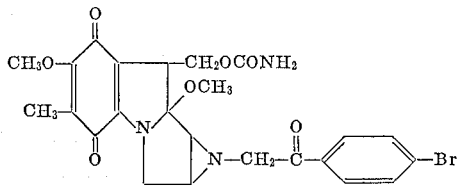

3. The compound of the formula:

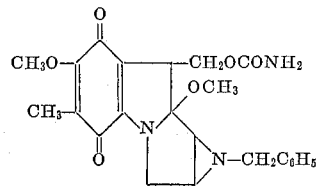

4. The compound of the formula:

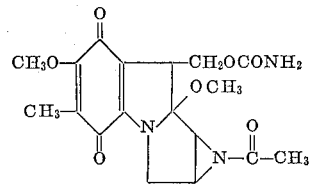

5. The compound of the formula:

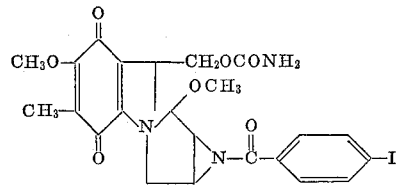

6. The compound of the formula:

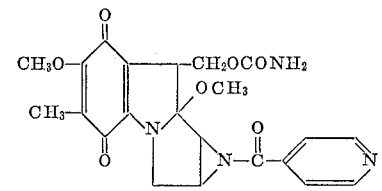

7. The compound of the formula:

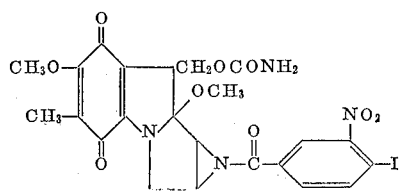

8. The compound of the formula:

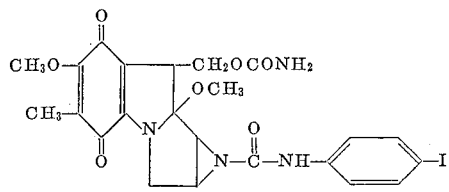

9. The compound of the formula:

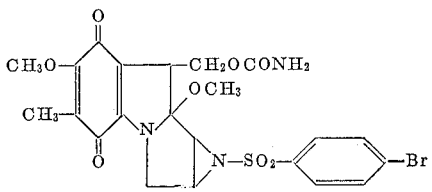

10. The compound of the formula:

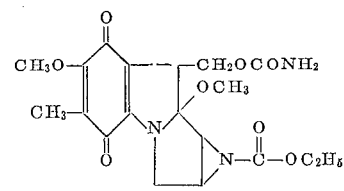

11. The compound of the formula:

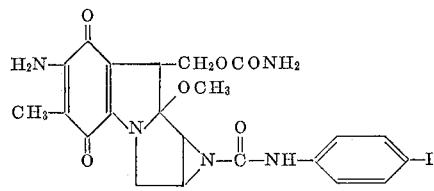

12. The compound of the formula:

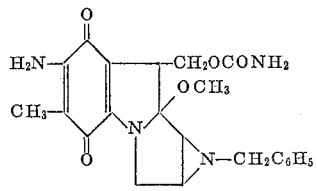

References Cited by the Examiner

UNITED STATES PATENTS 2,975,193    5/1961    Dice et al. _____ 260—313
3,012,040   12/1961    Lind et al. _____ 260—319

OTHER REFERENCES

Cram et al., Organic Chemistry, McGraw-Hill Book Co., Inc., New York, 1959, pp. 67 and 75.

De Boer et al., Antimicrobial Agents Annual, 1960, pp. 17–22 (1961).

De Somer et al., Antibiotics and Chemotherapy, vol. 5, 1955, pp. 632–638.

Hata et al., J. Antibiotics, Ser. A, IX, No. 4, pp. 141–146 (1956).

Webb et. al., J. American Chem. Soc., vol. 84, p. 3184 (1962).

NICHOLAS S. RIZZO, *Primary Examiner.*

E. E. BERG, MARY O'BRIEN, *Assistant Examiners.*